United States Patent
Saudan

(10) Patent No.: US 12,441,700 B2
(45) Date of Patent: Oct. 14, 2025

(54) HYDROGENATION OF IMINES WITH RU COMPLEXES

(71) Applicant: FIRMENICH SA, Satigny (CH)

(72) Inventor: Lionel Saudan, Satigny (CH)

(73) Assignee: FIRMENICHI SA, Satigny (CH)

( * ) Notice: Subject to any disclaimer, the term of this patent is extended or adjusted under 35 U.S.C. 154(b) by 1046 days.

(21) Appl. No.: 17/601,296

(22) PCT Filed: Jul. 30, 2020

(86) PCT No.: PCT/EP2020/071564
§ 371 (c)(1),
(2) Date: Oct. 4, 2021

(87) PCT Pub. No.: WO2021/023627
PCT Pub. Date: Feb. 11, 2021

(65) Prior Publication Data
US 2022/0162181 A1    May 26, 2022

(30) Foreign Application Priority Data
Aug. 8, 2019  (EP) ..................................... 19190783

(51) Int. Cl.
| C07D 333/20 | (2006.01) |
| B01J 31/18 | (2006.01) |
| B01J 31/24 | (2006.01) |
| C07F 15/00 | (2006.01) |

(52) U.S. Cl.
CPC .......... *C07D 333/20* (2013.01); *B01J 31/189* (2013.01); *B01J 31/2404* (2013.01); *C07F 15/0053* (2013.01); *B01J 2231/643* (2013.01); *B01J 2531/821* (2013.01)

(58) Field of Classification Search
CPC .. C07D 333/20; C07F 15/0053; B01J 31/183; B01J 31/2404; B01J 2231/643; B01J 2531/821
See application file for complete search history.

(56) References Cited

FOREIGN PATENT DOCUMENTS

| EP | 2623509 A1 | | 8/2013 |
| WO | 02/08169 | * | 1/2002 |
| WO | 0208169 A1 | | 1/2002 |
| WO | 03/097571 | * | 11/2003 |
| WO | 03097571 A1 | | 11/2003 |
| WO | 2005056513 A1 | | 6/2005 |
| WO | 2019/166578 | * | 2/2019 |
| WO | 2019166578 A1 | | 9/2019 |

OTHER PUBLICATIONS

Willoughby, J am hem Soc, 1992, vol. 114, 7562-7564. (Year: 1992).*
Mrsic, J Am Chem Soc, 2009, vol. 131, 8358-8359. (Year: 2009).*
International Search Report and Written Opinion for corresponding PCT/EP2020/071564 mailed Oct. 15, 2020, 13 Pages.

* cited by examiner

*Primary Examiner* — D Margaret M Seaman

(57) ABSTRACT

Describes herein are methods of using ruthenium complexes in base-free hydrogenation processes for the reduction of imines into the corresponding amines.

15 Claims, No Drawings

HYDROGENATION OF IMINES WITH RU COMPLEXES

CROSS-REFERENCE TO RELATED APPLICATIONS

This application is a U.S. National Phase Application of International Patent Application No. PCT/EP2020/071564, filed Jul. 30, 2020, which claims the benefit of priority to European Patent Application No. 19190783.1, filed Aug. 8, 2019, each of which is hereby incorporated by reference herein.

TECHNICAL FIELD

The present invention relates to the field of catalytic hydrogenation, more specifically, to the base-free hydrogenation of an imine into the corresponding amine in the presence of a catalytic amount of a ruthenium complex.

BACKGROUND

Reduction of an imine into the corresponding amine is one of the fundamental reactions in organic chemistry and is used in a large number of chemical processes. In general, two main types of processes are known to achieve such a transformation. Such types of processes are the following:
a) hydride processes, in which a silyl or metal hydride salt, such as $NaBH_4$, is used;
b) hydrogenation processes, in which molecular hydrogen is used.

From a practical point of view, hydrogenation processes are more attractive as they can be run using small amounts of catalyst (typically 10 to 1000 ppm relative to the substrate) and in the presence of small quantities or even in the absence of solvent. Furthermore, hydrogenation processes do not require the use of highly reactive and expensive hydrides, and do not produce important amounts of aqueous waste.

One of the mandatory and characterizing elements of hydrogenation processes is the catalyst or the catalytic system which is used to activate the molecular hydrogen in view of the reduction.

The catalytic hydrogenation of imine using homogeneous or heterogeneous catalyst has been largely described in the literature such as in WO 02/08169, WO 03/097571 or EP 2 623 509 disclosing the hydrogenation of imine in a presence of base and Ruthenium complex bearing a diamine ligand and a diphosphine ligand. However, some substrates, such as imines bearing at least one heteroaromatic ring or even two heteroaromatic rings still represent a challenging reaction sparsely reported. Actually, the presence of further heteroatom in the substrate may be detrimental to the reaction as the substrate and the product obtained may chelate to the metal center poisoning the catalytic system or a competing hydrogenation of heteroaromatic ring may occur. In particular, the few examples of the hydrogenation of thiophene-substituted imines reported only in WO 2008/125833, WO 2006/063178 and Zh. Org. Khim. 1965, 1, 1104-1108 using, respectively, the following heterogeneous catalysts Adam's catalyst, Pd/C and rhenium heptasulfide, reveal the challenge for this kind of substrates.

The development of useful homogeneous catalysts or catalytic systems for the hydrogenation of an imine group efficient for a large range of imine type of substrates represents still an important need in chemistry.

The present invention provides a solution to the above problem by performing said hydrogenation in a presence of a homogeneous ruthenium catalyst allowing reducing even the most challenging imine substrates. To the best of our knowledge, this process has never been reported.

SUMMARY OF THE INVENTION

Surprisingly, it has now been discovered that the imines comprising a heterocyclic group may be easily reduced under hydrogenation conditions using a homogeneous catalyst and in the absence of any additive, in particular in the absence of base.

So, a first object of the present invention is a process for the reduction by hydrogenation, using molecular $H_2$, of a $C_5$-$C_{20}$ substrate of formula

wherein $R^a$ and $R^c$ represent, independently from each other, a hydrogen atom or a $C_1$-$C_{15}$ hydrocarbon group optionally comprising one to three oxygen atoms and/or one to two nitrogen atoms and/or one sulphur or halogen atom; $R^b$ represent a $C_1$-$C_{15}$ hydrocarbon group optionally comprising one to three oxygen atoms and/or one to two nitrogen atoms and/or one sulphur or halogen atom, a hydrogen atom, a $SO_2R^{b'}$, a $OR^{b''}$ or a $POR^{b'}_2$ group wherein $R^{b'}$ represents a $C_1$-$C_6$ alkyl group or a phenyl or tolyl group and $R^{b''}$ represents a hydrogen atom, a $C_1$-$C_6$ alkyl group or a phenyl or tolyl group; or $R^a$ and $R^c$ represent, when taken together, a $C_1$-$C_{10}$ alkenediyl or alkenediyl group; provided than at least one $R^a$, $R^b$ or $R^c$ is not a hydrogen atom;
into the corresponding amine, characterized in that said process is carried out in the absence of base and in the presence of at least one catalyst or pre-catalyst of formula

wherein m is 0 when n is 0 or 1 or m is 1 when n is 0;
PP represents a $C_5$-$C_{50}$ bidentate ligand wherein the coordinating groups are two phosphino groups;
each P, simultaneously or independently, represents a $C_3$-$C_{30}$ monodentate ligand;
NN represents a $C_2$-$C_{20}$ bidentate ligand wherein the coordinating atoms are two nitrogen atoms; and
each Y represents, simultaneously or independently, a hydrogen or halogen atom.

DESCRIPTION OF THE INVENTION

The present invention relates to a process for the reduction by hydrogenation, using molecular $H_2$, of a $C_5$-$C_{20}$ substrate containing an imine functional groups into the corresponding amine, characterized in that said process is carried out in the presence of at least one catalyst or pre-catalyst in the form of a ruthenium complex having a bidentate diphosphine ligand or at least two monodentate phosphine ligands.

Said process allows reducing even the most challenging thiophene-substituted imines using a homogeneous ruthenium catalyst. In addition, said process is carried in the absence of any acidic or basic additive making it particularly interesting for sensitive substrates.

As well understood by a person skilled in the art, by "bidentate" it is understood that said ligand coordinates the Ru metal with two atoms (e.g. two P).

So, a first object of the present invention is a process for the reduction by hydrogenation, using molecular H$_2$, of a C$_5$-C$_{20}$ substrate of formula

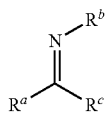
(I)

wherein R$^a$ and R$^c$ represent, independently from each other, a hydrogen atom or a C$_1$-C$_{15}$ hydrocarbon group optionally comprising one to three oxygen atoms and/or one to two nitrogen atoms and/or one sulphur or halogen atom; R$^b$ represent a C$_1$-C$_{15}$ hydrocarbon group optionally comprising one to three oxygen atoms and/or one to two nitrogen atoms and/or one sulphur or halogen atom, a hydrogen atom, a SO$_2$R$^{b'}$, a OR$^{b''}$ or a POR$^{b'}_2$ group wherein R$^{b'}$ represents a C$_1$-C$_6$ alkyl group or a phenyl or tolyl group and R$^{b''}$ represents a hydrogen atom, a C$_1$-C$_6$ alkyl group or a phenyl or tolyl group; or R$^a$ and R$^c$ represent, when taken together, a C$_1$-C$_{10}$ alkenediyl or alkenediyl group; provided than at least one R$^a$, R$^b$ or R$^c$ is not a hydrogen atom;

into the corresponding amine, characterized in that said process is carried out in the absence of base and in the presence of at least one catalyst or pre-catalyst of formula

wherein m is 0 when n is 0 or 1 or m is 1 when n is 0;
PP represents a C$_5$-C$_{50}$ bidentate ligand wherein the coordinating groups are two phosphino groups;
each P, simultaneously or independently, represents a C$_3$-C$_{30}$ monodentate ligand;
NN represents a C$_2$-C$_{20}$ bidentate ligand wherein the coordinating atoms are two nitrogen atoms; and
each Y represents, simultaneously or independently, a hydrogen or halogen atom.

It is understood that by " . . . hydrocarbon group . . . " it is meant that said group consists of hydrogen and carbon atoms and can be in the form of an aliphatic hydrocarbon, i.e. linear or branched saturated hydrocarbon (e.g. alkyl group), a linear or branched unsaturated hydrocarbon (e.g. alkenyl or alkynyl group), a saturated cyclic hydrocarbon (e.g. cycloalkyl) or an unsaturated cyclic hydrocarbon (e.g. cycloalkenyl or cycloalkynyl), or can be in the form of an aromatic hydrocarbon, i.e. aryl group, or can also be in the form of a mixture of said type of groups, e.g. a specific group may comprise a linear alkyl, a branched alkenyl (e.g. having one or more carbon-carbon double bonds), a (poly)cycloalkyl and an aryl moiety, unless a specific limitation to only one type is mentioned. Similarly, in all the embodiments of the invention, when a group is mentioned as being in the form of more than one type of topology (e.g. linear, cyclic or branched) and/or being saturated or unsaturated (e.g. alkyl, aromatic or alkenyl), it is also meant a group which may comprise moieties having any one of said topologies or being saturated or unsaturated, as explained above. Similarly, in all the embodiments of the invention, when a group is mentioned as being in the form of one type of saturation or unsaturation, (e.g. alkyl), it is meant that said group can be in any type of topology (e.g. linear, cyclic or branched) or having several moieties with various topologies. In all the embodiments of the invention, when it is mentioned that the hydrocarbon group may optionally comprises heteroatom such as oxygen atoms, nitrogen atoms or sulphur atoms, it is meant that at least one hydrogen atom of the hydrocarbon group may be substituted by a heteroatom and/or that carbon atom of the hydrocarbon chain may be substituted/replaced by a heteroatom; i.e. the hydrocarbon may comprise as substituent or, as part of the chain, functional group such as ether, thiol, amine, ester, amide.

The corresponding amine (I-a) provided by the invention's process; i.e hydrogenation of imine of formula (I), is of formula

(I-a)

wherein R$^a$, R$^b$ and R$^c$ have the same meaning as defined as in formula (I).

According to any one of the above embodiments of the invention, the compound of formula (I) may be in the form of any one of its stereoisomers or as a mixture thereof. For the sake of clarity, by the expression "any one of its stereoisomers or as a mixture thereof", or the similar, it is meant the normal meaning understood by a person skilled in the art, i.e. that the compounds of formula (I) can be a pure or be in the form of a mixture of enantiomers or diastereoisomers.

According to any one of the above embodiments of the invention, said compound of formula (I) can be in the form of its E or Z isomer or of a mixture thereof, e.g. the invention comprises compositions of matter consisting of one or more compounds of formula (I), having the same chemical structure but differing by the configuration of the imine double bond. In particular, compound (I) can be in the form of a mixture consisting of isomer E and Z and wherein said isomer E represent at least 0.5% of the total mixture, or even at least 50% of the total mixture, or even at least 75% (i.e a mixture E/Z comprised between 75/25 and 100/0).

According to any one of the above embodiments of the invention, the compound of formula (I) may be generated in situ by the condensation between a carbonyl compound of formula (R$^a$)(R$^c$)C(=O) and an amine of formula R$^b$NH$_2$.

According to any one of the above embodiments of the invention, R$^a$, R$^b$ and R$^c$ may represent, independently from each other, a hydrogen atom, a C$_1$-C$_{10}$ alkyl, alkenyl, alkanedienyl, aryl, heterocyclic, heteroarylalkyl or arylalkyl group, each optionally substituted by a hydroxyl group, a halogen atom, a C$_{1-6}$ alkyl group or a C$_{1-6}$ alkoxy group.

According to any one of the above embodiments of the invention, R$^a$, R$^b$ and R$^c$ may represent, independently from each other, a hydrogen atom, a C$_1$-C$_{10}$ alkyl, alkenyl, alkanedienyl, aryl, heterocyclic or arylalkyl group, each optionally substituted by a hydroxyl group, a C$_{1-6}$ alkyl group or a C$_{1-6}$ alkoxy group.

According to any one of the above embodiments of the invention, R$^a$, R$^b$ and R$^c$ may represent, independently from each other, a hydrogen atom, a C$_1$-C$_{10}$ linear alkyl group, a C$_2$-C$_{10}$ linear alkenyl group, a C$_3$-C$_{10}$ linear, branched or cyclic alkyl or alkenyl group, a C$_4$-C$_{10}$ linear, branched or cyclic alkadienyl group, a $C_{3-8}$ aryl, a $C_{2-8}$ heterocyclic or a $C_{6-12}$ arylalkyl group, each optionally substituted by a hydroxyl group, a $C_{1-6}$ alkyl group or a $C_{1-6}$ alkoxy group; or $R^a$ and $R^c$ represent, when taken together, a $C_1$-$C_{10}$ alkenediyl or alkenediyl group; provided than at least one $R^a$, $R^b$ or $R^c$ is not a hydrogen atom.

The expression "a linear, branched or cyclic alkyl, alkenyl or alkadienyl group" or similar designated that said $R^a$, $R^b$ and $R^c$ can be in the form of, e.g., a linear alkyl group or can also be in the form of a mixture of said type of groups, e.g. a specific $R^a$ may comprise a branched alkenyl, a (poly) cyclic alkyl and a linear alkyl moiety, unless a specific limitation to only one type is mentioned. Similarly, in all the below embodiments of the invention, when a group is mentioned as being an alkenyl or alkadienyl, it is meant that said group comprises one or two carbon-carbon double bonds which can be conjugated or not with the imine group or between them, in the case of alkadienyl. Similarly, in all the below embodiments of the invention, when a group is mentioned as being in the form of more than one type of topology (e.g. linear, cyclic or branched) and/or unsaturation (e.g. alkyl or alkenyl) it is meant also a group which may comprise moieties having any one of said topologies or unsaturations, as explained above. Similarly, in all the below embodiments of the invention, when a group is mentioned as being in the form of one type of unsaturation, (e.g. alkyl), it is meant that said group can be in any type of topology (e.g. linear, cyclic or branched) or having several moieties with various topologies.

The term "heterocyclic" or similar have the normal meaning in the art; i.e. an ring, such as aromatic ring, comprising at least one heteroatom such as oxygen, nitrogen or sulphur atom. Typical examples of heterocyclic group include, but are not limited to, groups derived from acridine, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole or xanthene.

The term "arylalkyl" have the normal meaning in the art; i.e. an acyclic alkyl group wherein one hydrogen atom is replaced with an aryl group.

The term "heteroarylalkyl" have the normal meaning in the art; i.e. an acyclic alkyl group wherein one hydrogen atom is replaced with a heterocyclic group.

According to any one of the invention's embodiments, the substrate is an imine that will provide an amine that is useful in the pharmaceutical, agrochemical, flavor or perfumery industry as final product or as an intermediate. Particularly preferred substrate is an imine that will provide an amine which is useful in the flavor and fragrance industry as final product or as an intermediate.

According to any one of the invention's embodiments, the substrate is a $C_5$-$C_{15}$ compound of formula (I).

According to any one of the invention's embodiments, the substrate is of formula

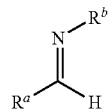

(I')

wherein $R^a$ and $R^b$ have the same meaning than above.

According to any one of the invention's embodiments, $R^a$ and $R^b$ may represent, independently from each other, a $C_1$-$C_8$ linear alkyl group, a $C_2$-$C_8$ linear alkenyl group, a $C_3$-$C_8$ linear, branched or cyclic alkyl or alkenyl group, a $C_4$-$C_8$ linear, branched or cyclic alkadienyl group, or a $C_{3-6}$ aryl, a $C_{2-6}$ heterocyclic $C_{6-8}$ heteroarylalkyl or a $C_{6-8}$ arylalkyl group, each optionally substituted by a hydroxyl group, a halogen atom, a $C_{1-3}$ alkyl group or a $C_{1-3}$ alkoxy group. According to any one of the invention's embodiments, $R^a$ and $R^b$ may represent, independently from each other, a $C_1$-$C_8$ linear alkyl group, a $C_2$-$C_8$ linear alkenyl group, a $C_3$-$C_8$ linear, branched or cyclic alkyl or alkenyl group, a $C_4$-$C_8$ linear, branched or cyclic alkadienyl group, or a $C_{3-6}$ aryl, a $C_{2-6}$ heterocyclic or a $C_{6-8}$ arylalkyl group, each optionally substituted by a hydroxyl group, a $C_{1-3}$ alkyl group or a $C_{1-3}$ alkoxy group. Preferably, $R^a$ and $R^b$ may represent, independently from each other, a $C_3$-$C_8$ cyclic alkyl group, a $C_{3-6}$ aryl, a $C_{2-6}$ heterocyclic or a $C_{6-8}$ arylalkyl group, each optionally substituted by a hydroxyl group, a $C_{1-3}$ alkyl group or a $C_{1-3}$ alkoxy group group. Preferably, $R^a$ and $R^b$ may represent, independently from each other, a $C_{3-6}$ aryl, a $C_{2-6}$ heterocyclic or a $C_{6-8}$ arylalkyl group, each optionally substituted by a hydroxyl group, a $C_{1-3}$ alkyl group or a $C_{1-3}$ alkoxy group group. Preferably, $R^a$ or $R^b$ may represent a $C_{2-6}$ heterocyclic group, each optionally substituted by a hydroxyl group, a $C_{1-3}$ alkyl group or a $C_{1-3}$ alkoxy group and the other may represent a $C_1$-$C_8$ linear alkyl group, a $C_2$-$C_8$ linear alkenyl group, a $C_3$-$C_8$ linear, branched or cyclic alkyl or alkenyl group, a $C_4$-$C_8$ linear, branched or cyclic alkadienyl group or a $C_{3-6}$ aryl, a $C_{2-6}$ heterocyclic or a $C_{6-8}$ arylalkyl group, each optionally substituted by a hydroxyl group, a $C_{1-3}$ alkyl group or a $C_{1-3}$ alkoxy group. Even more preferably, $R^a$ and $R^b$ may represent, independently from each other, a $C_{2-6}$ heterocyclic group optionally substituted by a hydroxyl group, a $C_{1-3}$ alkyl group or a $C_{1-3}$ alkoxy group. Preferably, $R^a$ and $R^b$ may represent, independently from each other, a $C_{2-6}$ heterocyclic group comprising from 1 to 3 heteroatoms selected from nitrogen, oxygen and sulphur atom, optionally substituted by one or two $C_{1-3}$ alkyl groups. Preferably, $R^a$ and $R^b$ represent, independently from each other a $C_{3-6}$ heterocyclic group comprising from 1 to 3 heteroatoms selected from nitrogen, oxygen and sulphur. Even more preferably, $R^a$ and $R^b$ represent, independently from each other a $C_{3-5}$ heterocyclic group comprising from 1 to 3 heteroatoms selected from nitrogen, oxygen and sulphur. Even more preferably, $R^a$ and $R^b$ represent, independently from each other a $C_{3-5}$ heterocyclic group comprising from 1 to 3 heteroatoms selected from nitrogen and sulphur.

According to any one of the above embodiments, $R^b$ represents a or a $C_{3-6}$ aryl, a $C_{6-8}$ arylalkyl or a $C_{3-5}$ heterocyclic group comprising from one or two nitrogen atoms, one oxygen atom and one sulphur atom or one nitrogen atom and one oxygen atom. Preferably, $R^b$ represents a phenyl or benzyl group or a $C_{3-5}$ heterocyclic group comprising from one or two nitrogen atoms, one nitrogen atom and one sulphur atom or one nitrogen atom and one oxygen atom. Preferably, $R^b$ represents a pyrazolyl group.

According to any one of the above embodiments, $R^a$ represents a phenyl group or a $C_{3-5}$ heterocyclic group comprising from one or two sulphur atoms, one oxygen atom, one nitrogen atom or one nitrogen atom and one sulphur atom. Preferably, $R^a$ represents a thiophenyl group.

Non-limiting examples of substrates of formula (I) may include N-phenyl-1-(thiophen-2-yl) methanimine, N-(1H-pyrazol-5-yl)-1-(thiophen-2-yl)methanimine, N-(4- methoxyphenethyl)-1-(thiophen-2-yl)methanimine, N-benzyl-1-(thiophen-2-yl)methanimine, N-benzyl-1-(p-tolyl)methanimine, N-benzyl-1-(2-methoxyphenyl)methanimine or N-(1H-pyrazol-5-yl)-1-(p-tolyl)methanimine, N-phenyl-1-(thiophen-2-yl)methanimine, N-benzyl-1-(thiophen-2-yl)methanimine, N-phenyl-1-(p-tolyl)methanimine, N-(4-methoxyphenyl)-1-phenylmethanimine, N-cyclohexyl-1-(p-tolyl)methanimine, N-(4-fluorophenyl)-1-(p-tolyl)methanimine, N-(4-methoxyphenyl)-1-(p-tolyl)methanimine, N-(2,4-dimethylphenyl)-1-(p-tolyl)methanimine, N-(pyridin-4-ylmethyl)-1-(p-tolyl)methanimine, 1-(thiophen-2-yl)-N-(thiophen-2-ylmethyl)methanimine.

In the present invention, the presence of acidic or basic additive is avoided. This is an advantage, since it allows significant increases in yields for the production of amines from acid- and/or base-sensitive imines. Therefore, according to anyone of the invention's embodiments, the substrate is an acid and/or base-sensitive compound.

According to any embodiment of the invention, the process of the invention is performed in absence of base.

According to any one of the invention's embodiments, the ruthenium complex can be of the general formula $$[Ru(PP)(P)_m(NN)_n(Y)_2] \quad (1)$$

wherein m is 0 when n is 0 or 1 or m is 1 when n is 0;
PP represents a $C_5$-$C_{50}$ bidentate ligand wherein the coordinating groups are two phosphino groups;
P represents a $C_3$-$C_{30}$ monodentate ligand;
NN represents a $C_2$-$C_{20}$ bidentate ligand wherein the coordinating groups are two amino groups; and
each Y represents, simultaneously or independently, a hydrogen or halogen atom.

According to any one of the invention's embodiments, m is 0 and n is 0 or 1. Preferably, m is 0 and n is 1.

According to any one of the invention's embodiments, in formula (1), each Y may represent, simultaneously or independently, a hydrogen, chlorine, bromine or iodine atom. Preferably, Y may represent, simultaneously or independently, a hydrogen or chlorine atom. Even more preferably, Y may represent a chlorine atom.

According to any one of the invention's embodiments, P may represent a mono-phosphine of formula $PR^d_3$, wherein $R^d$ is a $C_1$-$C_{12}$ group, such as linear, branched or cyclic alkyl, alkoxy or aryloxy group optionally substituted, substituted or unsubstituted phenyl, diphenyl or naphthyl or di-naphthyl group. More particularly $R^d$ may represent a substituted or unsubstituted phenyl, diphenyl or naphthyl or di-naphthyl group. Possible substituents are those cited below for the various groups $R^1$ to $R^{12}$. Preferably, P is a triphenylphosphine.

According to any one of the invention's embodiments, the bidentate NN ligand is a compound of formula

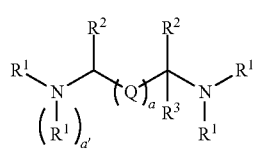

(B)

wherein a and a', simultaneously or independently, represent 0 or 1 (when a' is 0 then the nitrogen atom is part of an aromatic heterocycle);

the $R^1$, taken separately, represent, simultaneously or independently, a hydrogen atom or a $C_{1-6}$ linear, branched or cyclic alkyl group optionally substituted or a phenyl or a benzyl group optionally substituted; two $R^1$, taken together, may form a saturated heterocycle containing 3 to 7 atoms and including the atoms to which said $R^1$ are bonded, said heterocycle being optionally substituted;

$R^2$ and $R^3$, taken separately, represent, simultaneously or independently, a hydrogen atom, a $C_{1-6}$ linear, branched alkyl group optionally substituted or a $C_{6-10}$ aromatic group optionally substituted; a $R^1$ and an adjacent $R^2$, taken together, may form a saturated or unsaturated heterocycle containing 5 to 8 atoms and including the atoms to which said $R^1$ and $R^2$ are bonded, and optionally containing one additional nitrogen or oxygen atom; two $R^2$, taken together, may form a saturated or unsaturated ring having 5 to 8 atoms and including the carbon atoms to which said two $R^2$ groups are bonded, said ring optionally containing one additional nitrogen and/or oxygen atom; and Q represents a group of formula

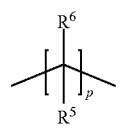

(i)

wherein p is 1 or 2, and
$R^5$ and $R^6$ represent, simultaneously or independently, a hydrogen atom, a $C_{1-6}$ linear, branched or cyclic alkyl group optionally substituted or a $C_{6-10}$ aromatic group optionally substituted; two distinct $R^6$ and/or $R^5$ groups, taken together, may form a $C_{3-8}$ saturated ring optionally substituted, including the atoms to which said $R^6$ and/or $R^5$ groups are bonded, and optionally containing one or two additional nitrogen or oxygen atoms.

According to an embodiment, by "aromatic group or ring" it is meant a phenyl or naphthyl group.

As mentioned above, in said ligand (B) the atoms which may coordinate the Ru atom are the two N atoms bearing the $R^1$ groups. Therefore, it is also understood that whenever said $R^1$, $R^2$, $R^3$, $R^5$, $R^6$ or any other group comprises heteroatoms such as N or O, said heteroatoms are not coordinating.

Possible optional substituents of $R^1$, $R^2$, $R^3$, $R^5$, $R^6$ are one, two, three or four groups selected amongst i) halogens (in particular when said substituents are on aromatic moieties), ii) $C_{1-6}$ alkoxy, alkyl, alkenyl, or iii) a benzyl group or a fused or non-fused phenyl group, said group being optionally substituted by one, two or three halogen, $C_{1-8}$ alkyl, alkoxy, amino, nitro, ester, sulfonate or halo- or perhalo-hydrocarbon groups.

For the sake of clarity, and as mentioned above, in any one of the embodiments of the present invention, whenever two groups of formula (B) are taken together to form a cycle or ring, said cycle or ring can be a mono or bi-cyclic group.

According to any one of the invention's embodiments of said bidentate NN ligand, each $R^1$, simultaneously or independently, represents a hydrogen atom or a $C_{1-4}$ linear or branched alkyl group. Preferably, $R^1$, simultaneously or independently, represents a hydrogen atom or a methyl or ethyl group.

According to any one of the invention's embodiments of said bidentate (NN) ligand, at least one $R^1$ represents a hydrogen atom, or even at least two $R^1$ represents a hydrogen atom, or even the four $R^1$ represent a hydrogen atom.

According to any one of the invention's embodiments of said bidentate NN ligand, $R^2$ and $R^3$, taken separately, represent, simultaneously or independently, a hydrogen atom, a $C_{1-4}$ linear or branched alkyl group optionally substituted or a phenyl group optionally substituted; a $R^1$ and an adjacent $R^2$, taken together, may form a saturated or unsaturated heterocycle containing 5 or 6 atoms and including the atoms to which said $R^1$ and $R^2$ are bonded and optionally containing one additional oxygen atom; two $R^2$, taken together, may form a saturated or unsaturated ring having 5 or 6 atoms and including the atoms to which said $R^2$ or $R^3$ groups are bonded, said ring being optionally substituted and optionally containing one additional oxygen atom.

According to any one of the invention's embodiments of said bidentate NN ligand, $R^2$ and $R^3$, taken separately, represent, simultaneously or independently, a hydrogen atom, a $C_{1-4}$ linear or branched alkyl group or a phenyl group; a $R^1$ and an adjacent $R^2$, taken together, may form a saturated or aromatic heterocycle containing 6 atoms and including the atoms to which said $R^1$ and $R^2$ are bonded; two $R^2$, taken together, may form a saturated or unsaturated ring having 5 or 6 atoms and including the atoms to which said two $R^2$ groups are bonded.

According to any one of the invention's embodiments of said bidentate NN ligand, said Q represents a group of formula

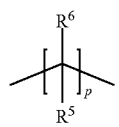

(i)

wherein p is 1 or 2, and
$R^5$ and $R^6$ represent, simultaneously or independently, a hydrogen atom, a $C_{1-4}$ linear or branched alkyl group or a phenyl group optionally substituted.

According to any one of the invention's embodiments of said bidentate NN ligand, said $R^5$ and $R^6$ represent, simultaneously or independently, a hydrogen atom, or a $C_{1-4}$ linear alkyl group.

According to a particular embodiment of the invention, said Q can be a group of formula (i) wherein p is 1 or 2, $R^5$ is a hydrogen atom and $R^6$ is as defined above.

According to any one of the invention's embodiments of said bidentate NN ligand, said ligand NN is represented by formula

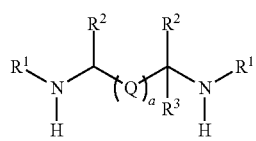

(B')

wherein a represents 0 or 1;
each $R^1$, simultaneously or independently, represents a hydrogen atom or a $C_{1-4}$ linear or branched alkyl group or a benzyl group optionally substituted;

$R^2$ and $R^3$, taken separately, represent, simultaneously or independently, a hydrogen atom, a $C_{1-4}$ linear or branched alkyl group optionally substituted or a phenyl group optionally substituted; a $R^1$ and an adjacent $R^2$, taken together, may form a saturated heterocycle containing 6 atoms and including the atoms to which said $R^1$ and $R^2$ are bonded, and being optionally substituted; two $R^2$ taken together, may form a saturated ring having 5 to 6 atoms and including the carbon atoms to which said $R^2$ groups are bonded; and
Q represents a group of formula

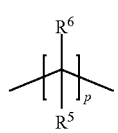

(i)

wherein p is 1 or 2, and
$R^5$ and $R^6$ represent, simultaneously or independently, a hydrogen atom, a $C_{1-4}$ linear or branched alkyl group or a phenyl group optionally substituted.

According to a particular aspect of the above embodiment, said ligand NN of formula (B') is one wherein
a represents 0 or 1;
each $R^1$, simultaneously or independently, represents a hydrogen atom or a $C_{1-4}$ alkyl group;
$R^2$ and $R^3$, taken separately, represent, simultaneously or independently, a hydrogen atom; two $R^2$ taken together, may form a saturated ring having 5 to 6 atoms and including the carbon atoms to which said $R^2$ groups are bonded; and
Q represents a group of formula

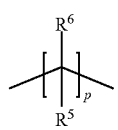

(i)

wherein p is 1 or 2, and
$R^5$ and $R^6$ represent, simultaneously or independently, a hydrogen atom, a $C_{1-4}$ linear alkyl group.

According to any one of the invention's embodiments, said ligand NN is represented by formula

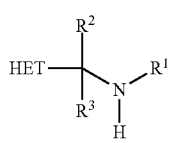

(B")

wherein $R^1$ represents a hydrogen atom or a $C_{1-4}$ linear or branched alkyl group;
$R^2$ and $R^3$, taken separately, represent, simultaneously or independently, a hydrogen atom, a $C_{1-4}$ linear or branched alkyl group; and
HET represents a 2-pyridinyl group optionally substituted by one, two or three $C_{1-4}$ linear or branched alkyl groups or by a benzyl group or a fused or non-fused phenyl or indanyl group, said group being optionally substituted by one, two or three halogen, $C_{1-4}$ alkyl, alkoxy, amino, nitro, ester or sulfonate groups, such as a 2-pyridyl, 2-quinolinyl or a methyl-2-pyridinyl.

According to a particular embodiment of formula (B"), $R^1$ represents, a hydrogen atom.

According to a particular embodiment of formula (B"), $R^2$ and $R^3$, taken separately, represent, simultaneously or independently, a hydrogen atom.

According to a particular embodiment of formula (B"), HET represents a 2-pyridinyl group optionally substituted by one, two or three $C_{1-4}$ linear or branched alkyl groups or a fused or non-fused phenyl group, such as a 2-pyridyl, 2-quinolinyl or a methyl-2-pyridinyl.

According to any one of the invention's embodiments of said bidentate NN ligand, the possible substituents of $R^1$, $R^2$, $R^3$, $R^5$ or $R^6$ of formulae (B), (B') or (B") are one or two i) halogens, ii) $C_{1-5}$ alkyl or alkoxy groups, or iii) a fused or non-fused phenyl group, said group being optionally substituted by one, two or three halogen, $C_{1-4}$ alkyl or alkoxy groups.

As non-limiting examples of N—N ligands one can cite the ones in the following Scheme (A):

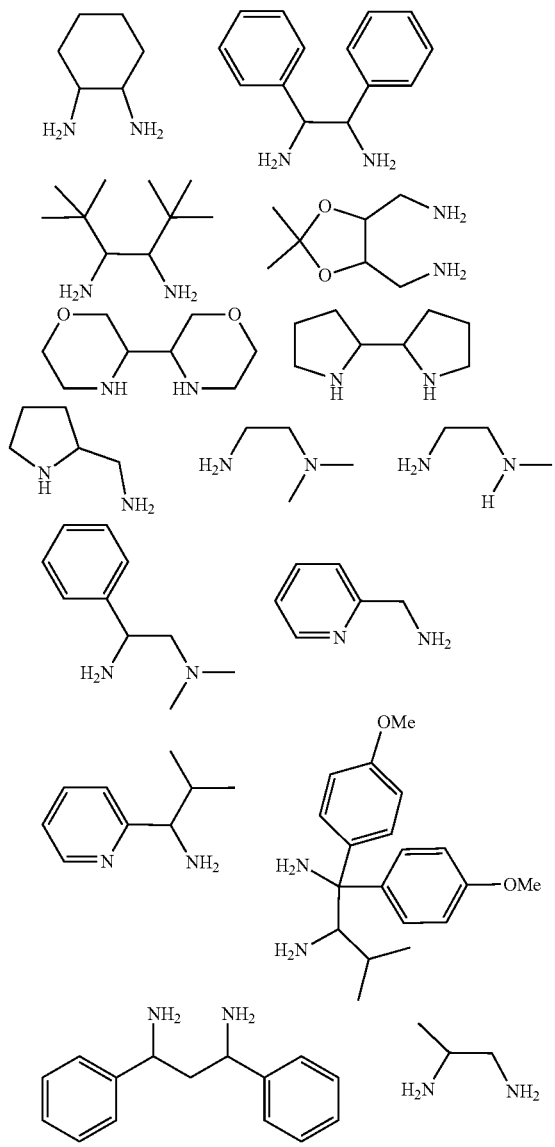
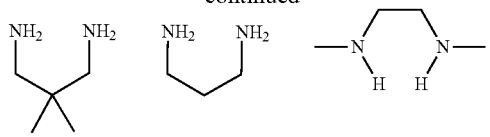
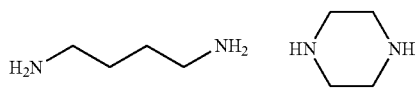
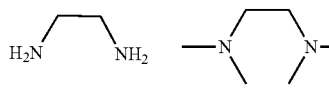
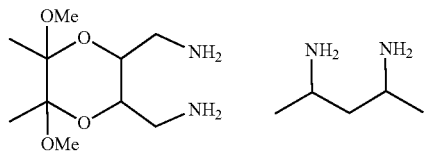
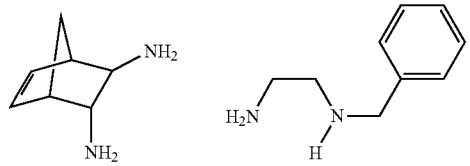
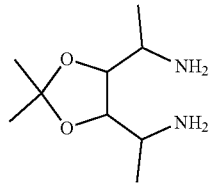

said compounds being in an optically active form or in a racemic form, if applicable.

Preferably, the ligand (NN) may be selected from the group consisting of ethane-1,2-diamine, N,N-dimethyl-ethane-1,2-diamine, N,N,N',N'-tetramethylethane-1,2-diamine, 1,2-diphenylethane-1,2-diamine, (1R,2R)-1,2-diphenylethane-1,2-diamine, cyclohexane-1,2-diamine, (1R,2R)-cyclohexane-1,2-diamine, propane-1,3-diamine and pyridin-2-ylmethanamine. Even more preferably, the ligand (NN) may be selected from the group consisting of ethane-1,2-diamine and pyridin-2-ylmethanamine.

According to any one of the embodiments of the present invention, the bidentate ligand (PP) can be a compound of formula

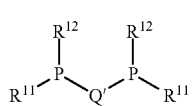

(C)

wherein $R^{11}$ and $R^{12}$, when taken separately, represent, simultaneously or independently, a $C_{1-6}$ linear alkyl group optionally substituted, a $C_{3-6}$ branched or cyclic alkyl group optionally substituted or a $C_{6-10}$ aromatic group optionally substituted; and Q' represents
a group of formula

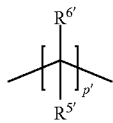

wherein p' is 1, 2, 3 or 4 and

R$^{5'}$ and R$^{6'}$ represent, simultaneously or independently, a hydrogen atom, a C$_{1-6}$ linear or branched alkyl group optionally substituted or a C$_{6-10}$ aromatic group optionally substituted; two distinct R$^{6'}$ and/or R$^{5'}$ groups, taken together, may form a C$_3$ to C$_8$ saturated or unsaturated ring optionally substituted, including the atoms to which said R$^{6'}$ and/or R$^{5'}$ groups are bonded, and optionally containing one or two additional nitrogen or oxygen atoms; or a C$_{10}$-C$_{16}$ metallocenediyl, a 2,2'-diphenyl, a 1,1'-binaphthalene-2,2'-diyl, a benzenediyl, a naphthalenediyl, 2,3-bicyclo[2:2:1]hept-5-enediyl, 4,6-phenoxazinediyl, 4,5-(9,9-dimethyl)-xanthenediyl, 4,6-10H-phenoxazinediyl, 2,2'-(oxybis(2,1-phenylene)) or bis(phen-2-yl) ether group, each optionally substituted.

As mentioned above, according to a particular embodiment of the invention, by "aromatic group or ring" for (PP) it is also meant a phenyl or naphthyl derivative.

As mentioned above, in said ligand (C) the atoms which may coordinate the Ru atom are the P atoms of the PR$^{11}$R$^{12}$ groups. Therefore, it is also understood that whenever said R$^{5'}$, R$^{6'}$, R$^{11}$, R$^{12}$, Q' or any other group comprises heteroatoms such as N or O, said heteroatoms are not coordinating.

Possible substituents of R$^{5'}$, R$^{6'}$, R$^{11}$ and R$^{12}$ are one to five halogens (in particular when said substituents are on aromatic moieties), or one, two or three i) C$_{1-6}$ linear or branched alkyl, alkoxy groups or halo- or perhalo-hydrocarbon, amine groups, ii) COOR$^h$ wherein R$^h$ is a C$_{1-6}$ linear, branched or cyclic alkyl group, iii) NO$_2$ group, or iv) a benzyl group or a fused or non-fused phenyl group, said group being optionally substituted by one, two or three halogen, C$_{1-8}$ alkyl, alkoxy, amino, nitro, ester, sulfonate or halo- or perhalo-hydrocarbon groups. By "halo- or perhalo-hydrocarbon" it is meant groups such as CF$_3$ or CClH$_2$ for instance.

For the sake of clarity, and as mentioned above, in any one of the embodiments of the present invention, whenever two groups of formula (C) are taken together to form a cycle or ring, said cycle or ring can be a mono or bi-cyclic group.

According to any one of the invention's embodiments of said bidentate PP ligand, R$^{11}$ and R$^{12}$, when taken separately, represent, simultaneously or independently, a C$_{3-6}$ branched or cyclic alkyl group or a C$_{6-10}$ aromatic group, or preferably a phenyl group, optionally substituted.

According to any one of the invention's embodiments of said bidentate PP ligand, R$^{11}$ and R$^{12}$ represent each, simultaneously or independently, a C$_{3-6}$ branched or cyclic alkyl group or a phenyl group optionally substituted. Preferably, R$^{11}$ and R$^{12}$ represent each, simultaneously or independently a isopropyl, a cyclohexyl or a phenyl group.

According to any one of the invention's embodiments of said bidentate PP ligand, Q' represents
a group of formula

wherein p' is 1, 2, 3 or 4 and

R$^{5'}$ and R$^{6'}$ represent, simultaneously or independently, a hydrogen atom, a C$_{1-4}$ linear or branched alkyl group or a C$_{6-10}$ aromatic group, or preferably a phenyl group, optionally substituted; two distinct R$^{6'}$ and/or R$^{5'}$ groups, taken together, may form a C$_{4-6}$ saturated or unsaturated ring optionally substituted, including the atoms to which said R$^{6'}$ and/or R$^{5'}$ groups are bonded; or a C$_{10}$-C$_{16}$ metallocenediyl, a 2,2'-diphenyl a benzenediyl, a naphthalenediyl, a 1,1'-binaphthalene-2,2'-diyl, 2,3-bicyclo[2:2:1]hept-5-enediyl, 4,6-phenoxazinediyl, 4,5-(9,9-dimethyl)-xanthenediyl4,6-10H-phenoxazinediyl, 2,2'-(oxybis(2,1-phenylene)) or bis(phen-2-yl) ether group, each optionally substituted.

According to any one of the invention's embodiments of said bidentate PP ligand, Q' may represent a linear C$_{1-4}$ alkanediyl radical, a 1,2- or 1,1'-C$_{10-12}$ metallocenediyl, a 2,2'-diphenyl, a 1,2-benzenediyl, a 1,1'-binaphthalene-2,2'-diyl, or a 1,8- or 1,2-naphthalenediyl, 4,6-10H-phenoxazinediyl or 2,2'-(oxybis(2,1-phenylene)) group, each optionally substituted. Preferably, Q' may represent a linear C$_{1-4}$ alkanediyl radical, a 1,2- or 1,1'-C$_{10-12}$ metallocenediyl group.

According to a particular embodiment of the invention, said PP ligand is a compound of formula (C) wherein R$^{11}$ and R$^{12}$ represent, simultaneously or independently, a C$_{3-6}$ branched or cyclic alkyl group or a phenyl group optionally substituted; and Q' represents a C$_1$-C$_4$ alkanediyl radical optionally substituted, a C$_{10}$-C$_{12}$ ferrocenediyl, a 2,2'-diphenyl, a 1,1'-binaphthalene-2,2'-diyl, a 1,2-benzenediyl or a naphthalenediyl group.

According to any one of the invention's embodiments of said bidentate PP ligand, said ligand is a compound wherein one, two or three of the Q', R$^{11}$ and R$^{12}$ groups are satured groups (i.e. alkyl or alkanediyl groups). In particular Q' represents a C$_1$-C$_4$ alkanediyl radical optionally substituted and/or R$^{11}$ and R$^{12}$ a branched or cyclic alkyl group.

Possible substituents of said R$^{11}$ or R$^{12}$ are as described above for R$^1$ to R$^6$. Possible substituents of said Q' are as described above for Q.

As non-limiting examples of PP ligands, one can cite the ones in the following Scheme (B):

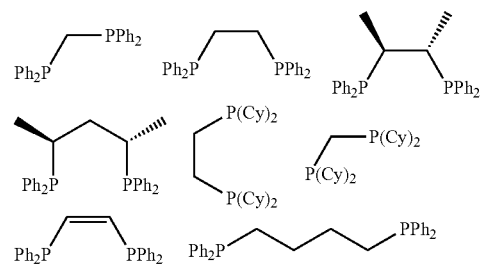

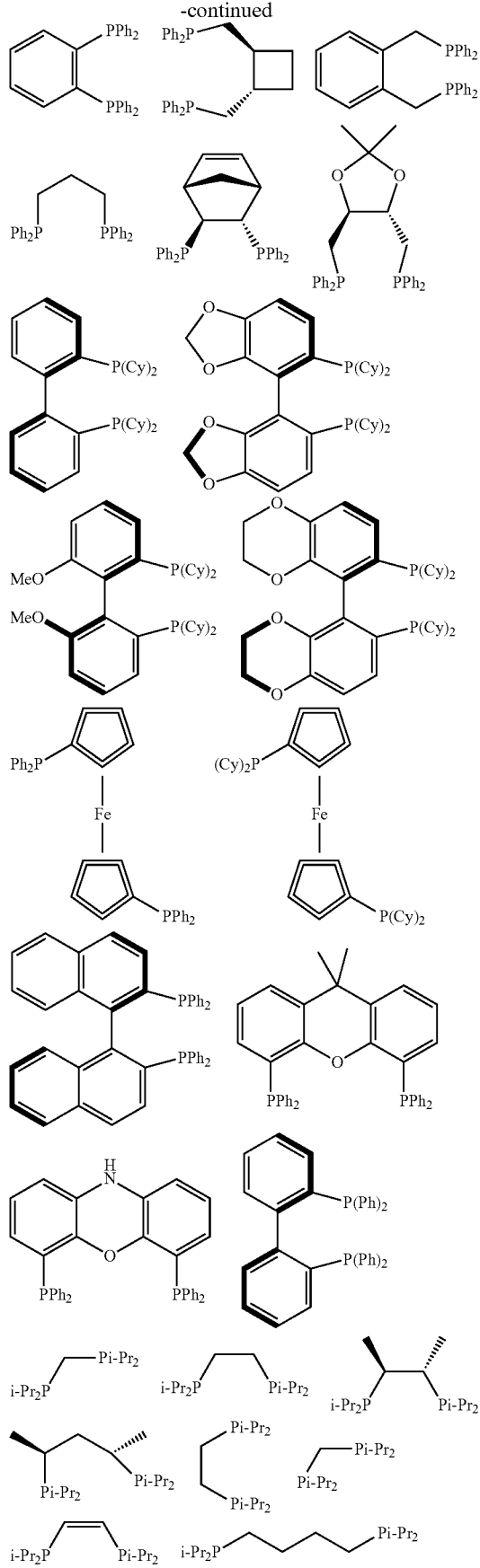
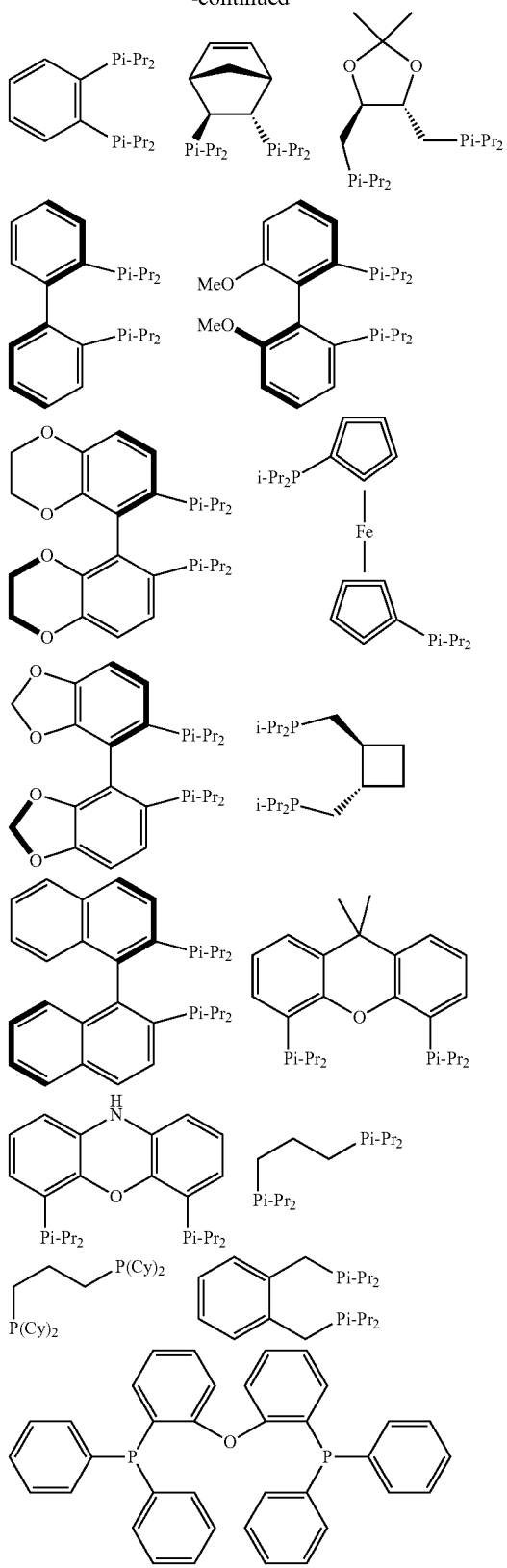
said compounds being in an optically active form or in a racemic form, if applicable, and wherein Ph represents a phenyl group, Cy represents a $C_{5-6}$ cycloalkyl group and i-Pr represents an iso-propyl group. It is also understood that in the above diphosphines, one may replace Cy group by a Ph group or vice versa.

Preferably, the ligand (PP) may be selected from the group consisting of bis(dicyclohexylphosphanyl)methane, 1,2-bis(dicyclohexylphosphanyl)ethane, 1,2-bis(diphenylphosphanyl)ethane, 1,2-bis(diphenylphosphanyl)ethane, 1,3-bis(diisopropylphosphanyl)propane, 1,3-bis(dicyclohxylphosphanyl)propane, 1,3-bis(diphenylphosphanyl)propane, (2,3-butane-2,3-diyl)bisdiphenylphosphane, 1,4-bis(diphenylphosphanyl)butane, 1,1'-bis(diphenylphosphanyl)ferrocene, 1,1'-bis(diisopropylphosphanyl)ferrocene, 1,1'-bis(dicyclohexylphosphanyl)ferrocene, 2,2'-bis(diphenylphosphaneyl)-1,1'-biphenyl, 2,2'-bis(dicyclohexylphosphaneyl)-1,1'-biphenyl, (oxybis(2,1-phenylene))bis(diphenylphosphane) and 4,6-bis(diphenylphosphanyl)-10H-phenoxazine. Preferably, the ligand (PP) may be 1,2-bis(diphenylphosphanyl)ethane, 1,3-bis(diisopropylphosphanyl)propane, 1,3-bis(dicyclohexylphosphanyl)propane, 1,3-bis(diphenylphosphanyl)prop ane, (2,3-butane-2,3-diyl)bisdiphenylphosphane, 1,4-bis(diphenylphosphanyl)butane, (oxybis(2,1-phenylene))bis(diphenylphosphane), 4,6-bis(diphenylphosphanyl)-10H-phenoxazine or 1,1'-bis(diphenylphosphanyl)ferrocene. Preferably, the ligand (PP) may be 1,2-bis(diphenylphosphanyl)ethane, 1,3-bis(dicyclohexylphosphanyl)propane, 1,3-bis(diphenylphosphanyl)propane, (2,3-butane-2,3-diyl)bis(diphenylphosphane, (oxybis(2,1-phenylene))bis(diphenylphosphane) or 4,6-bis(diphenylphosphanyl)-10H-phenoxazine. Even more preferably, the ligand (PP) may be 1,2-bis(diphenylphosphanyl)ethane.

The ligands described above can be obtained by applying standard general methods which are well known in the state of the art and by the person skilled in the art. Many of said ligands NN or PP are even commercially available.

The complexes of formula (1) are generally prepared and isolated prior to their use in the process starting from [Ru(Cl)$_2$(PPh$_3$)$_3$] or [(arene)RuCl$_2$]$_2$ as reported in the literature, see Lindner, E. & al. *J. Organometallics Chemistry* 2003, 665, 176-185 and Lemmon, I. C. *Acc. Chem. Res.* 2007, 40, 1291-1299.

As previously mentioned, the processes of the invention consist in the hydrogenation of a substrate using a ruthenium complex in the absence of an acid or a base. A typical process implies the mixture of the substrate with the ruthenium complex, and optionally a solvent, and then treating such a mixture with molecular hydrogen at a chosen pressure and temperature.

The complexes of the invention, an essential parameter of the process, can be added to the reaction medium in a large range of concentrations. As non-limiting examples, one can cite as complex concentration values those ranging from 1 ppm to 10000 ppm relative to the amount of substrate. Preferably, the complex concentration will be comprised between 10 ppm to 5000 ppm. Even more preferably, the complex concentration will be comprised between 100 ppm to 2500 ppm It goes without saying that the optimum concentration of complex will depend, as the person skilled in the art knows, on the nature of the latter, on the nature and quality of the substrate, on the nature of the solvent used if any, on the reaction temperature and on the pressure of $H_2$ used during the process, as well as the desired time of reaction.

The hydrogenation reaction can be carried out in the presence or absence of a solvent. When a solvent is required or used for practical reasons, then any solvent current in hydrogenation reactions can be used for the purposes of the invention. Non-limiting examples include $C_{6-10}$ aromatic solvents such as toluene or xylene; $C_{5-12}$ hydrocarbon solvents such as hexane or cyclohexane; $C_{4-8}$ ethers such as tetrahydrofuran or MTBE; $C_{4-10}$ esters such as ethyl acetate; $C_{1-2}$ chlorinated hydrocarbon, such as dichloromethane; $C_{1-6}$ primary or secondary alcohols, such as methanol, isopropanol or ethanol; $C_{2-6}$ polar solvents such as acetone; or mixtures thereof. In particular said solvent can be a protic solvent such as methanol, isopropanol or ethanol. The choice of the solvent is a function of the nature of the complex and the substrate, and the person skilled in the art is well able to select the solvent most convenient in each case to optimize the hydrogenation reaction.

In the hydrogenation process of the invention, the reaction can be carried out at a $H_2$ pressure comprised between $10^5$ Pa and $80 \times 10^5$ Pa (1 to 100 bars) or even more if desired. Again, a person skilled in the art is well able to adjust the pressure as a function of the catalyst load and of the dilution of the substrate in the solvent. As examples, one can cite typical pressures of 5 to $50 \times 10^5$ Pa (5 to 50 bars).

The temperature at which the hydrogenation can be carried out is comprised between 0° C. and 200° C., more preferably in the range of between 50° C. and 150° C. Of course, a person skilled in the art is also able to select the preferred temperature as a function of the melting and boiling point of the starting and final product as well as the desired time of reaction or conversion.

EXAMPLES

The invention will now be described in further detail by way of the following examples, wherein the temperatures are indicated in degrees centigrade and the abbreviations have the usual meaning in the art.

All the procedures described hereafter have been carried out under an inert atmosphere unless stated otherwise. Hydrogenations were carried out in stainless steel autoclave. $H_2$ gas (99.99990%) was used as received. NMR spectra were recorded on a Bruker AM-400 ($^1$H at 400.1 MHz, $^{13}$C {$^1$H} at 100.6 MHz, and $^{31}$P at 161.9 MHz) spectrometer and normally measured at 300 K, in $CD_2Cl_2$ unless indicated otherwise. Chemical shifts are listed in ppm.

Example 1

Catalytic hydrogenation of imines using complex [Ru(Cl)$_2$(PP)(N1)]

General procedure for the catalytic hydrogenation of (E)-N-phenyl-1-(thiophen-2-yl) methanimine as substrate:

Under argon, a 75 ml stainless steel autoclave equipped with a magnetic stirring bar was successively charged with [Ru(Cl)$_2$(L1)(N1) (14.4 mg, 0.023 mmoles, 0.2 mol %), the imine (1.8956 g, 10.02 mmoles) and MeOH (10 ml). The autoclave was sealed, purged with hydrogen (5×20 bar) and placed under hydrogen (50 bar). Then the autoclaved was heated at 100° C. and the reaction mixture stirred. After 24 h, the autoclave was cooled to RT and ventilated. Then, an aliquot (0.1 ml) was taken, diluted with MTBE (1 ml) and analysed by GC (Chirasil Dex CB).

The results with various diphosphines taken from Table 3 are shown in Table 1.

TABLE 1

Hydrogenation of (E)-N-phenyl-1-(thiophen-2-yl)methanimine using [Ru(Cl)$_2$(PP)(N1)]:

| Test | PP[a] | Ru[b] | Conv.[c] | Amine[d] |
|---|---|---|---|---|
| 1 | L1 | 2000 | 99 | 93 |
| 2 | L3 | 2000 | 69 | 60 |

[a]Diphosphines used as described in Table 3. Diamines used as described in Table 4.
[b]Molar ratio of the complex in ppm relative to the substrate.
[c]Conversion calculated according to amount of starting material left as measured by GC (Chirasil Dex CB).
[d]Amount of desired amine as measured by GC (Chirasil Dex CB).

Example 2

Catalytic hydrogenation of imines using complex [Ru(Cl)$_2$(PP)(N2)]

General procedure for the catalytic hydrogenation of (E)-N-phenyl-1-(thiophen-2-yl) methanimine as substrate:
Under argon, a 75 ml stainless steel autoclave equipped with a magnetic stirring bar was successively charged with [Ru(Cl)$_2$(L1)(N2) (19.0 mg, 0.028 mmoles, 0.2 mol %), the imine (1.8756 g, 10.02 mmoles) and MeOH (10 ml). The autoclave was sealed, purged with hydrogen (5×20 bar) and placed under hydrogen (50 bar). Then the autoclaved was heated at 100° C. and the reaction mixture stirred. After 24 h, the autoclave was cooled to RT and ventilated. Then, an aliquot (0.1 ml) was taken, diluted with MTBE (1 ml) and analysed by GC (Chirasil Dex CB).

The results with various diphosphines taken from Table 2 are shown in Table 1.

TABLE 2

Hydrogenation of (E)-N-phenyl-1-(thiophen-2-yl)methanimine using [Ru(Cl)$_2$(PP)(N2)]:

| Test | PP[a] | Ru[b] | Conv.[c] | Amine[d] |
|---|---|---|---|---|
| 1 | L1 | 2000 | 99 | 95 |
| 2 | L2 | 2000 | 71 | 61 |
| 3 | L3 | 2000 | 78 | 66 |
| 4 | L4 | 2000 | 61 | 49 |

[a]Diphosphines used as described in Table 3. Diamines used as described in Table 4.
[b]Molar ratio of the complex in ppm relative to the substrate.
[c]Conversion calculated according to amount of starting material left as measured by GC (Chirasil Dex CB).
[d]Amount of desired amine as measured by GC (Chirasil Dex CB).

TABLE 3

Structure and names of diphosphines used

| Ligand | Structure | Name |
|---|---|---|
| L1 | | 1,2-bis(diphenylphosphanyl)ethane |
| L2 | | 1,3-bis(dicyclohexylphosphanyl)propane |
| L3 | | (oxybis(2,1-phenylene))bis(diphenylphosphane) |

TABLE 3-continued

Structure and names of diphosphines used

| Ligand | Structure | Name |
|---|---|---|
| L4 | 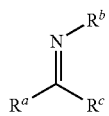 | 4,6-bis(diphenylphosphanyl)-10H-phenoxazine |

TABLE 4

Structure and names of diamines used.

| Ligand | Structure | Name |
|---|---|---|
| N1 | 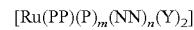 | ethane-1,2-diamine |
| N2 | 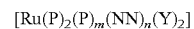 | pyridin-2-ylmethanamine |

Example 3

Catalytic Hydrogenation of Imines Using Complex [Ru(Cl)$_2$(PP)(PPh$_3$)]

General procedure for the catalytic hydrogenation of (E)-N-phenyl-1-(thiophen-2-yl)methanimine as substrate:

Under argon, a 75 ml stainless steel autoclave equipped with a magnetic stirring bar was successively charged with [Ru(Cl)$_2$(L3)(PPh$_3$) (19.7 mg, 0.020 mmoles, 0.2 mol %), the imine (1.8868 g, 10.12 mmoles) and MeOH (10 ml). The autoclave was sealed, purged with hydrogen (5×20 bar) and placed under hydrogen (50 bar). Then the autoclaved was heated at 100° C. and the reaction mixture stirred. After 24 h, the autoclave was cooled to RT and ventilated. Then, an aliquot (0.1 ml) was taken, diluted with MTBE (1 ml) and analysed by GC (Chirasil Dex CB).

The results with various diphosphines taken from Table 3 are shown in Table 5.

TABLE 5

Hydrogenation of (E)-N-phenyl-1-(thiophen-2-yl)methanimine using [Ru(Cl)$_2$(PP)(PPh$_3$)]:

| Test | PP$^{a)}$ | Ru$^{b)}$ | Conv.$^{c)}$ | Amine$^{d)}$ |
|---|---|---|---|---|
| 1 | L3 | 2000 | 100 | 85 |
| 2 | L4 | 2000 | 84 | 74 |

$^{a)}$Diphosphines used as described in Table 3.
$^{b)}$Molar ratio of the complex in ppm relative to the substrate.
$^{c)}$Conversion calculated according to amount of starting material left as measured by GC (Chirasil Dex CB).
$^{d)}$Amount of desired amine as measured by GC (Chirasil Dex CB).

The invention claimed is:

1. A process for the reduction by hydrogenation, using molecular H$_2$, of a C$_5$-C$_{20}$ substrate of formula $$\underset{R^a}{\overset{R^b}{\underset{\|}{N}}}\underset{R^c}{} \quad (I)$$

wherein R$^a$ and R$^c$ represent, independently from each other, a hydrogen atom or a C$_1$-C$_{15}$ hydrocarbon group optionally comprising one to three oxygen atoms and/or one to two nitrogen atoms and/or one sulphur or halogen atom; R$^b$ represent a C$_1$-C$_{15}$ hydrocarbon group optionally comprising one to three oxygen atoms and/or one to two nitrogen atoms and/or one sulphur or halogen atom, a hydrogen atom, a SO$_2$R$^{b'}$, a OR$^{b''}$, or a POR$^{b''}_2$ group, wherein R$^{b'}$ represents a C$_1$-C$_6$ alkyl group or a phenyl or tolyl group and R$^{b''}$ represents a hydrogen atom, a C$_1$-C$_6$ alkyl group, or a phenyl or tolyl group; or R$^a$ and R$^c$ represent, when taken together, a C$_1$-C$_{10}$ alkanediyl or alkenediyl group; provided than at least one R$^a$, R$^b$, or R$^c$ is not a hydrogen atom;
into the corresponding amine, characterized in that said process is carried out in the absence of base and in the presence of at least one catalyst or pre-catalyst of formula absence of base and in the presence of at least one catalyst or pre-catalyst of formula $$[Ru(PP)(P)_m(NN)_n(Y)_2] \quad (1)$$

or $$[Ru(P)_2(P)_m(NN)_n(Y)_2] \quad (1')$$

wherein m is 0 when n is 0 or 1 or m is 1 when n is 0;
PP represents a C$_5$-C$_{50}$ bidentate ligand wherein the coordinating groups are two phosphino groups;
each P, simultaneously or independently, represents a C$_3$-C$_{30}$ monodentate ligand;
NN represents a C$_2$-C$_{20}$ bidentate ligand wherein the coordinating atoms are two nitrogen atoms; and
each Y represents, simultaneously or independently, a hydrogen or halogen atom.

2. The process according to claim 1, wherein R$^a$, R$^b$ and R$^c$ represent, independently from each other, a hydrogen atom, a C$_1$-C$_{10}$ linear alkyl group, a C$_2$-C$_{10}$ linear alkenyl group, a C$_3$-C$_{10}$ linear, branched or cyclic alkyl or alkenyl group, a C$_4$-C$_{10}$ linear, branched or cyclic alkadienyl group, a C$_{3-8}$ aryl, a C$_{2-8}$ heterocyclic, or a C$_{6-12}$ arylalkyl group, each optionally substituted by a hydroxyl group, a C$_{1-6}$ alkyl group, or a C$_{1-6}$ alkoxy group; or R$^a$ and R$^c$ represent, when taken together, a C$_1$-C$_{10}$ alkanediyl or alkenediyl group; provided than at least one R$^a$, R$^b$, or R$^c$ is not a hydrogen atom.

3. The process according to claim 1, wherein R$^c$ is a hydrogen atom.

4. The process according to claim 1, wherein $R^a$ or $R^b$ represent a $C_{2-6}$ heterocyclic group optionally substituted by a hydroxyl group, a $C_{1-3}$ alkyl group or a $C_{1-3}$ alkoxy group and the other represents a $C_1$-$C_8$ linear alkyl group, a $C_2$-$C_8$ linear alkenyl group, a $C_3$-$C_8$ linear, branched or cyclic alkyl or alkenyl group, a $C_4$-$C_8$ linear, branched or cyclic alkadienyl group, or a $C_{3-6}$ aryl, $C_{2-6}$ heterocyclic, or $C_{6-8}$ arylalkyl group, each optionally substituted by a hydroxyl group, a $C_{1-3}$ alkyl group, or a $C_{1-3}$ alkoxy group.

5. The process according to claim 1, wherein $R^a$ and $R^b$ represent, independently from each other a $C_{3-6}$ heterocyclic group comprising from 1 to 3 heteroatoms selected from nitrogen, oxygen, and sulphur.

6. The process according to claim 1, wherein the catalyst or the pre-catalyst is of formula $$[Ru(PP)(NN)_n(Y)_2] \quad (1)$$

wherein PP, NN, Y, and n have the same meaning as defined in claim 1.

7. The process according to claim 1, wherein each Y represents, simultaneously or independently, a hydrogen or chlorine atom.

8. The process according to claim 1, wherein the bidentate NN ligand is a compound of formula

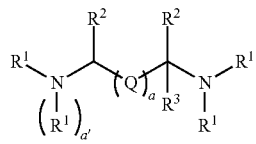

(B)

wherein a and a', simultaneously or independently, represent 0 or 1, when a' is 0 then the nitrogen atom is part of an aromatic heterocycle;

the $R^1$, taken separately, represent, simultaneously or independently, a hydrogen atom or a $C_{1-6}$ linear, branched, or cyclic alkyl group optionally substituted or a phenyl or a benzyl group optionally substituted; two $R^1$, taken together, may form a saturated heterocycle containing 3 to 7 atoms and including the atoms to which said $R^1$ are bonded, said heterocycle being optionally substituted;

$R^2$ and $R^3$, taken separately, represent, simultaneously or independently, a hydrogen atom, a $C_{1-6}$ linear, branched alkyl group optionally substituted, or a $C_{6-10}$ aromatic group optionally substituted; a $R^1$ and an adjacent $R^2$, taken together, may form a saturated or unsaturated heterocycle containing 5 to 8 atoms and including the atoms to which said $R^1$ and $R^2$ are bonded, and optionally containing one additional nitrogen or oxygen atom; two $R^2$, taken together, may form a saturated or unsaturated ring having 5 to 8 atoms and including the carbon atoms to which said two $R^2$ groups are bonded, said ring optionally containing one additional nitrogen and/or oxygen atom; and Q represents a group of formula

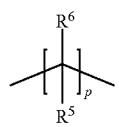

(i)

wherein p is 1 or 2, and $R^5$ and $R^6$ represent, simultaneously or independently, a hydrogen atom, a $C_{1-6}$ linear, branched, or cyclic alkyl group optionally substituted or a $C_{6-10}$ aromatic group optionally substituted; two distinct $R^6$ and/or $R^5$ groups, taken together, may form a $C_{3-8}$ saturated ring optionally substituted, including the atoms to which said $R^6$ and/or $R^5$ groups are bonded, and optionally containing one or two additional nitrogen or oxygen atoms.

9. The process according to claim 8, wherein a is 0.

10. The process according to claim 8, wherein the bidendate (NN) ligand is selected from the group consisting of ethane-1,2-diamine, N,N-dimethylethane-1,2-diamine, N,N,N',N'-tetramethylethane-1,2-diamine, 1,2-diphenylethane-1,2-diamine, (1R,2R)-1,2-diphenylethane-1,2-diamine, cyclohexane-1,2-diamine, (1R,2R)-cyclohexane-1,2-diamine, propane-1,3-diamine, and pyridin-2-ylmethanamine.

11. The process according to claim 1, wherein the bidentate ligand (PP) is a compound of formula

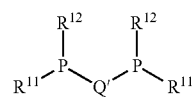

(C)

wherein $R^{11}$ and $R^{12}$, when taken separately, represent, simultaneously or independently, a $C_{1-6}$ linear alkyl group optionally substituted, a $C_{3-6}$ branched or cyclic alkyl group optionally substituted, or a $C_{6-10}$ aromatic group optionally substituted; and Q' represents
a group of formula

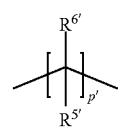

(i')

wherein p' is 1, 2, 3, or 4, and $R^{5'}$ and $R^{6'}$ represent, simultaneously or independently, a hydrogen atom, a $C_{1-6}$ linear or branched alkyl group optionally substituted, or a $C_{6-10}$ aromatic group optionally substituted; two distinct $R^{6'}$ and/or $R^{5'}$ groups, taken together, may form a $C_3$ to $C_8$ saturated or unsaturated ring optionally substituted, including the atoms to which said $R^{6'}$ and/or $R^{5'}$ groups are bonded, and optionally containing one or two additional nitrogen or oxygen atoms; or a $C_{10}$-$C_{16}$ metallocenediyl, a 2,2'-diphenyl, a 1,1'-binaphthalene-2,2'-diyl, a benzenediyl, a naphthalenediyl, 2,3-bicyclo[2:2:1] hept-5-enediyl, 4,6-phenoxazinediyl, 4,5-(9,9-dimethyl)-xanthenediyl, 4,6-10H-phenoxazinediyl, 2,2'-(oxybis(2,1-phenylene)), or bis(phen-2-yl) ether group, each optionally substituted.

12. The process according to claim 11, wherein the $R^{11}$ and $R^{12}$, when taken separately, represent, simultaneously or independently, a $C_{3-6}$ branched or cyclic alkyl group or a $C_{6-10}$ aromatic group.

13. The process according to claim 11, wherein the Q' represents a linear $C_{1-4}$ alkanediyl radical, a 1,2- or 1,1'-

$C_{10-12}$ metallocenediyl, a 2,2'-diphenyl, a 1,2-benzenediyl, a 1,1'-binaphthalene-2,2'-diyl, or a 1,8- or 1,2-naphthalenediyl, 4,6-10H-phenoxazinediyl or 2,2'-(oxybis(2,1-phenylene)) group, each optionally substituted.

14. The process according to claim 11, wherein the (PP) ligand is selected from the group consisting of bis(dicyclohexylphosphanyl) methane, 1,2-bis(dicyclohexylphosphanyl) ethane, 1,2-bis(diphenylphosphanyl) ethane, 1,2-bis(diphenylphosphanyl) ethane, 1,3-bis(diisopropylphosphanyl) propane, 1,3-bis(dicyclohxylphosphanyl) propane, 1,3-bis(diphenylphosphanyl) propane, (2,3-butane-2,3-diyl)bisdiphenylphosphane, 1,4-bis(diphenylphosphanyl) butane, 1,1'-bis(diphenylphosphanyl) ferrocene, 1,1'-bis(diisopropylphosphanyl) ferrocene, 1,1'-bis(dicyclohexylphosphanyl) ferrocene, 2,2'-bis(diphenylphosphaneyl)-1,1'-biphenyl, 2,2'-bis(dicyclohexylphosphaneyl)-1,1'-biphenyl, (oxybis(2,1-phenylene))bis(diphenylphosphane), and 4,6-bis(diphenylphosphanyl)-10H-phenoxazine.

15. The process according to claim 1, wherein the complexes of formula (1) is generated directly in situ.

\* \* \* \* \*